United States Patent [19]

Jia

[11] Patent Number: 5,641,191
[45] Date of Patent: Jun. 24, 1997

[54] SUN SHIELD SWIVEL APPARATUS FOR VEHICLES AND THE LIKE

[76] Inventor: Xuekui Jia, 11413 Lower Azusa Rd., El Monte, Calif. 91731

[21] Appl. No.: 543,400

[22] Filed: Oct. 16, 1995

[51] Int. Cl.$^6$ .................................................. B60J 3/02
[52] U.S. Cl. ................. 276/97.6; 296/97.13; 248/276.1; 248/288.51; 403/90; 16/224
[58] Field of Search ................. 296/97.6, 97.9, 296/97.11–97.13; 248/288.31, 288.51, 278.1, 279.1, 281.11, 181.1, 481, 484, 276.1; 403/90; 16/224

[56] References Cited

U.S. PATENT DOCUMENTS

| | | | |
|---|---|---|---|
| 390,790 | 11/1888 | Luce | 296/97.12 |
| 807,857 | 12/1905 | Palmenberg | 248/288.31 X |
| 1,275,311 | 8/1918 | Schumacher et al. | 248/279.1 |
| 1,473,878 | 11/1923 | Roy | 296/97.12 |
| 1,518,956 | 12/1924 | Bettman | 248/484 X |
| 1,791,699 | 2/1931 | Ayersman | 296/97.12 |
| 1,806,059 | 5/1931 | Hoople | 248/484 X |
| 1,922,295 | 8/1933 | Hunter | 296/97.12 |
| 2,578,130 | 12/1951 | Ford | 403/90 X |
| 2,939,585 | 6/1960 | Burgin | 248/278.1 X |
| 4,003,597 | 1/1977 | Acuff | 296/97.6 |
| 4,090,733 | 5/1978 | Altschul | 296/97.6 |
| 4,703,972 | 11/1987 | Omberg | 296/97.12 |
| 4,976,486 | 12/1990 | Rifaat | 296/97.6 X |
| 5,088,852 | 2/1992 | Davister | 403/90 X |

FOREIGN PATENT DOCUMENTS

| | | | |
|---|---|---|---|
| 82968 | 6/1957 | Denmark | 296/97.12 |
| 589296 | 5/1925 | France . | |
| 647582 | 11/1928 | France | 403/90 |
| 665300 | 9/1929 | France | 296/97.12 |
| 735389 | 11/1932 | France . | |
| 868400 | 2/1953 | Germany . | |
| 57-182521 | 5/1981 | Japan | 296/97.2 |
| 58-116223 | 12/1981 | Japan | 296/97.12 |
| 154382 | 7/1932 | Switzerland | 296/97.9 |
| 224434 | 11/1924 | United Kingdom | 290/97.12 |
| 270581 | 5/1927 | United Kingdom | 248/288.51 |
| 436479 | 11/1935 | United Kingdom . | |
| 475136 | 11/1937 | United Kingdom | 296/97.12 |
| 503192 | 3/1939 | United Kingdom | 248/484 |

*Primary Examiner*—Dennis H. Pedder
*Attorney, Agent, or Firm*—Thomas I. Rozsa; Tony D. Chen

[57] ABSTRACT

A sun shield swivel apparatus is used inside a vehicle for shielding sunlight or on coming vehicle headlights from the eyes of the driver. The sun shield swivel apparatus has a clamping member, an inner swinging arm, an outer telescoping swinging arm, a first universal joint assembly connected between the inner swinging arm and the outer telescopic swinging arm, a sun screen and a second universal joint assembly connected between the outer telescopic swinging arm and the sun screen. The sun shield swivel apparatus can be swiveled to any position imaginable inside the vehicle because of the universal joint assemblies and the outer telescopic swinging arm, thereby allowing the user to position the sun screen to any desired location.

12 Claims, 5 Drawing Sheets

SUN SHIELD SWIVEL APPARATUS FOR VEHICLES AND THE LIKE

BACKGROUND OF THE INVENTION

1. Field of the Invention

The present invention relates to the field of vehicle accessories. More particularly, the present invention relates to the field of sun screens for shielding the sun's rays or on coming headlights from direct line of sight of the eyes of a driver driving a vehicle.

2. Description of the Prior Art

Many prior art devices have been proposed in the past for shielding the sun's rays from direct line of sight of the driver's eyes while driving a vehicle. Presently, vehicles have a visor that swivels outwardly and downwardly from the vehicle's roof. Such visors only cover a limited area and it is difficult to swing or pivot the same to block substantially all directions of the sunlight. Although many attachments have been suggested in the past, no prior art visor is known which can block the sunlight substantially in any direction.

The following thirteen (13) prior art patents were uncovered in the pertinent field of the present invention:

1. U.S. Pat. No. 390,790 issued to Luce on Oct. 9, 1888 for "Sunshade For Vehicles" (hereafter "the Luce Patent");

2. U.S. Pat. No. 1,473,878 issued to Roy on Nov. 13, 1923 for "Glare Shield Device" (hereafter "the Roy Patent");

3. U.S. Pat. No. 1,791,699 issued to Ayersman on Feb. 10, 1931 for "Glare Shield For Automobiles" (hereafter "the Ayersman Patent");

4. U.S. Pat. No. 1,922,295 issued to Hunter on Aug. 15, 1933 for "Inside Glare Shield" (hereafter "the Hunter Patent");

5. British Patent No. 224,434 issued to Reeves on Nov. 13, 1924 for "A New Or Improved Light Subduing Screen For Motor Vehicles" (hereafter "the '434 British Patent");

6. British Patent No. 436,479 issued to O'Riordan on Oct. 11, 1935 for "Improvements In Or Connected With Joints For Brackets And The Like" (hereafter "the '479 British Patent");

7. British Patent No. 475,136 issued to Austin on Nov. 15, 1937 for "Improvements In Or Relating To Glare Visors For Vehicles" (hereafter "the '136 British Patent");

8. French Patent No. 589,296 (hereafter "the '296 French Patent");

9. French Patent No. 665,300 (hereafter "the '300 French Patent");

10. French Patent No. 735,389 (hereafter "the '389 French Patent");

11. German Patent No. 868,400 (hereafter "the '400 German Patent");

12. Japanese Patent No. 57-182,521 (hereafter "the '521 Japanese Patent"); and

13. Japanese Patent No. 58-116,223 (hereafter "the '223 Japanese Patent").

The Luce Patent discloses a sunshade for vehicles. It comprises a vertical angular bracket, a horizontal arm pivotedly attached to the vertical angular bracket, two horizontal swinging telescopic bars and a vertical and longitudinal swinging shade frame. One of the two horizontal swinging telescopic bars is pivotedly attached the horizontal arm. The swinging shade frame is attached to the other one of the two horizontal swinging telescopic bars.

The Roy Patent discloses a glare shield device. It comprises a clamp member, a tube attached to the clamp member, a cylindrical bar extends telescopically into the tube, and a glare shield attached to the cylindrical bar. Joints in the glare shield device effect the movement of the glare shield in the horizontal and vertical planes.

The Ayersman Patent discloses a glare shield for automobiles. It comprises a screen which has a channel shaped rib bent to arcuate form, a rod rigidly secured to the channel and is arranged as a chord with a rounded portion, a sheet of colored transparent material gripped between sides of the channel shaped rib, and supporting means frictionally engaged with the rounded portion and extends to a point adjacent the center of the arc of the rib.

The Hunter Patent discloses an inside glare shield. It comprises a support with a plurality of notches formed along its length and mounted on an automobile. A sliding member is slidably engaged with the support. A spring actuated means is adapted to be selectively engaged to any of the notches to releasably lock the sliding member in adjusted position along the length of the support. The sliding member has an outstanding horizontal ear with notches and an arm pivoted to the ear for swinging movement in a horizontal plane. The spring actuated means on the arm is adapted to selectively engage the notches on the ear to lock the arm in adjusted position. A glare shield is adjustably mounted upon the arm.

The '434 British Patent discloses a light subduing screen for vehicles. The light screen is attached to an outer linking arm which is attached to an inner linking arm. The inner linking arm is attached to a support structure which is mounted to the vehicle. The light screen can be positioned to any position to shield the eyes of the driver.

The '479 British Patent discloses an improvement in or connected with joints for brackets and the like.

The '136 British Patent discloses improvements in or relating to glare visors for vehicles.

The '296 French Patent, as disclosed from the figures shows a screen attached to an outer linking arm which is connected to an inner linking arm.

The '389 French Patent, as disclosed from the figures shows a screen attached to a telescoping rod.

The '300 French Patent, as disclosed from the figures shows a screen attached to a telescoping rod.

The '400 German Patent discloses a glare shield of a light absorbent material in the field of vision of the driver driving a vehicle such that only a small portion of the total field of vision is shielded.

The '251 Japanese Patent discloses a spot covering type sun visor. It comprises an expansion arm which has five pipes with different diameters so that it can be freely expanded and contracted. A small sized sun visor is fixed to the small diameter tip of the arm and the large diameter part constitute a spherical joint such that the base part is pivotably supported with respect to support means, where the support means is attached to a front window of a vehicle.

The '223 Japanese Patent discloses a sun glass type sun-shade apparatus for a vehicle.

None of these prior art patents have disclosed a sun shield swivel apparatus which is designed and constructed for mechanically holding, maneuvering and maintaining the desired position to block the sunlight from direct line of sight of the driver's eyes while driving a vehicle, and such that the road conditions will not effect a sun screen from the desired position. It is highly desirable to have a very efficient and also very effective design and construction of a sun shield swivel apparatus which can swivel to any position imaginable inside the vehicle, thereby blocking substantially the sunlight. It is desirable to provide a sun shield swivel apparatus with the capability of rapidly changing the position of a sun screen in a much more efficient way which will not interfere with the normal use and effectiveness of the vehicle.

SUMMARY OF THE INVENTION

The present invention is an unique sun shield swivel apparatus which can be utilized inside a vehicle. The sun shield swivel apparatus comprises a clamping member, an inner swinging arm, an outer telescoping swinging arm, a first universal joint assembly connected between the inner swinging arm and the outer telescopic swinging arm, a sun screen and a second universal joint assembly connected between the outer telescopic swinging arm and the sun screen. Each universal joint assembly comprises a hollow cylindrical shaped cylinder, a tension screw for tightening or loosening the tension of the universal joint assembly and a linking adaptor. The clamp member may be clamped inside the vehicle, preferably on the visor or the rear-view mirror or any suitable part inside the vehicle, so that the sun shield swivel apparatus will not interfere with the normal use and effectiveness of the vehicle.

What is unique about the sun shield swivel apparatus is that it can be swiveled to any position imaginable inside the vehicle because of the universal joint assemblies and the swinging arms, thereby allowing the user to position the sun screen to any desired location and maintaining that position by friction.

The outer telescopic swinging arm can be telescoped for shortening the distance in order to shield the driver's eyes from the direct sunlight shining through the front windshield or it can be telescopically extended to shield the driver's eyes from the direct sunlight shining through any direction inside the vehicle.

It is therefore an object of the present invention to provide a sun shield swivel apparatus that protects against sunlight or on coming headlights from all areas of visibility inside a vehicle, without overly impeding the driver's vision of the road and environs.

It is also an object of the present invention to provide a sun shield swivel apparatus which can be attached to any part inside a vehicle and will not interfere with the normal use and effectiveness of the vehicle.

It is an additional object of the present invention to provide a sun shield swivel apparatus which comprises universal joint assemblies capable of maintaining the desired position of a sun screen once it is positioned, so that the road conditions will not effect the position of the sun screen.

It is a further object of the present invention to provide a sun shield swivel apparatus comprised of a telescoping swinging arm which is extendable or retractable for lengthening or shortening the distance of a sun screen to block the sunlight or on coming headlights from direct line of sight of the driver's eyes.

It is an additional object of the present invention to provided a sun shield swivel apparatus capable of swivelling to any position imaginable inside a vehicle, thereby allowing the user to position a sun screen to any desired location and maintaining the same position by friction.

It is still another object of the present invention to provide a sun shield swivel apparatus comprised of a plurality of different shaped sun screens for blocking the sunlight or on coming headlights from direct line of sight of the driver's eyes.

In the preferred embodiment of the present invention, the sun shield swivel apparatus comprises a clamping member, an inner swinging arm, an outer telescoping swinging arm, a first universal joint assembly connected between the inner swinging arm and the outer telescopic swinging arm, a sun screen and a second universal joint assembly connected between the outer telescopic swinging arm and the sun screen.

In an alternative embodiment of the present invention, the sun shield swivel apparatus comprises a clamping member, an inner swinging arm, an outer telescoping swinging arm, an universal joint assembly connected between the inner swinging arm and the outer telescopic swinging arm, and a sun screen.

In another alternative embodiment of the present invention, the sun shield swivel apparatus does not have any universal joint assemblies but comprises linking adapters connecting a clamping member, an inner swinging arm, an outer telescoping swinging arm and a sun screen.

In a further alternative embodiment of the present invention, the sun shield swivel apparatus comprises a fastener means, at least three swinging arms connected to each other and a sun screen.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 6 is a perspective view of an alternative embodiment of the present invention sun shield swivel apparatus;

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
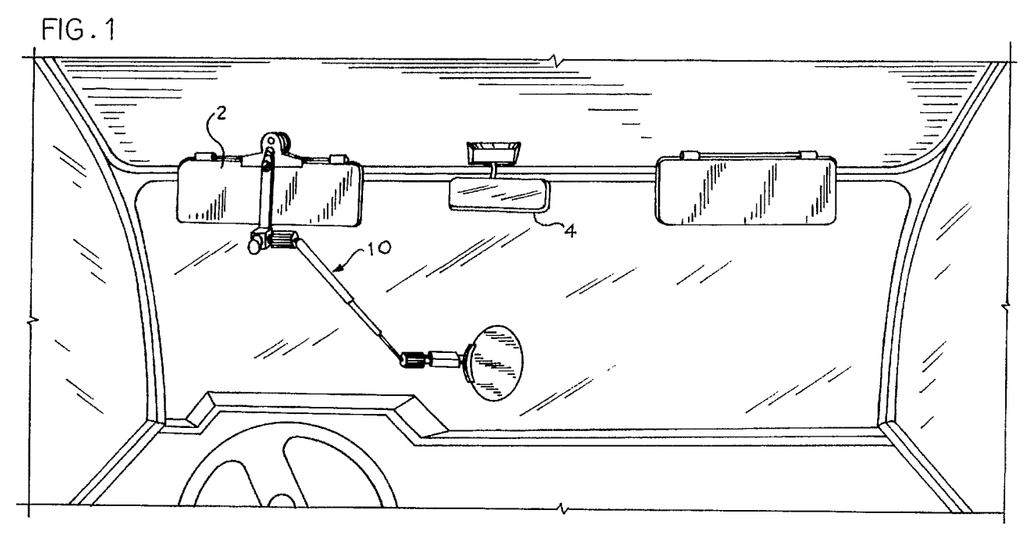
FIG. 1 is an illustration of the present invention sun shield swivel apparatus installed inside a vehicle.

Referring to FIG. 1, there is shown an illustration of the present invention sun shield swivel apparatus 10 installed inside a vehicle. The sun shield swivel apparatus 10 is adapted to block the sunlight from direct line of sight of the eyes of an occupant of the vehicle. Although the present invention sun shield swivel apparatus 10 is clamped to a conventional sun visor 2, it will be appreciated that FIG. 1 is for illustration purposes only. It is emphasized that while the sun visor 2 is the preferred clamping location, it is also within the spirit and scope of the present invention wherein the sun shield swivel apparatus 10 can be clamped to any part inside the vehicle such as a rear-view mirror 4 and will not interfere with the normal use and effectiveness of the vehicle.

Figures 2, 3, 4:
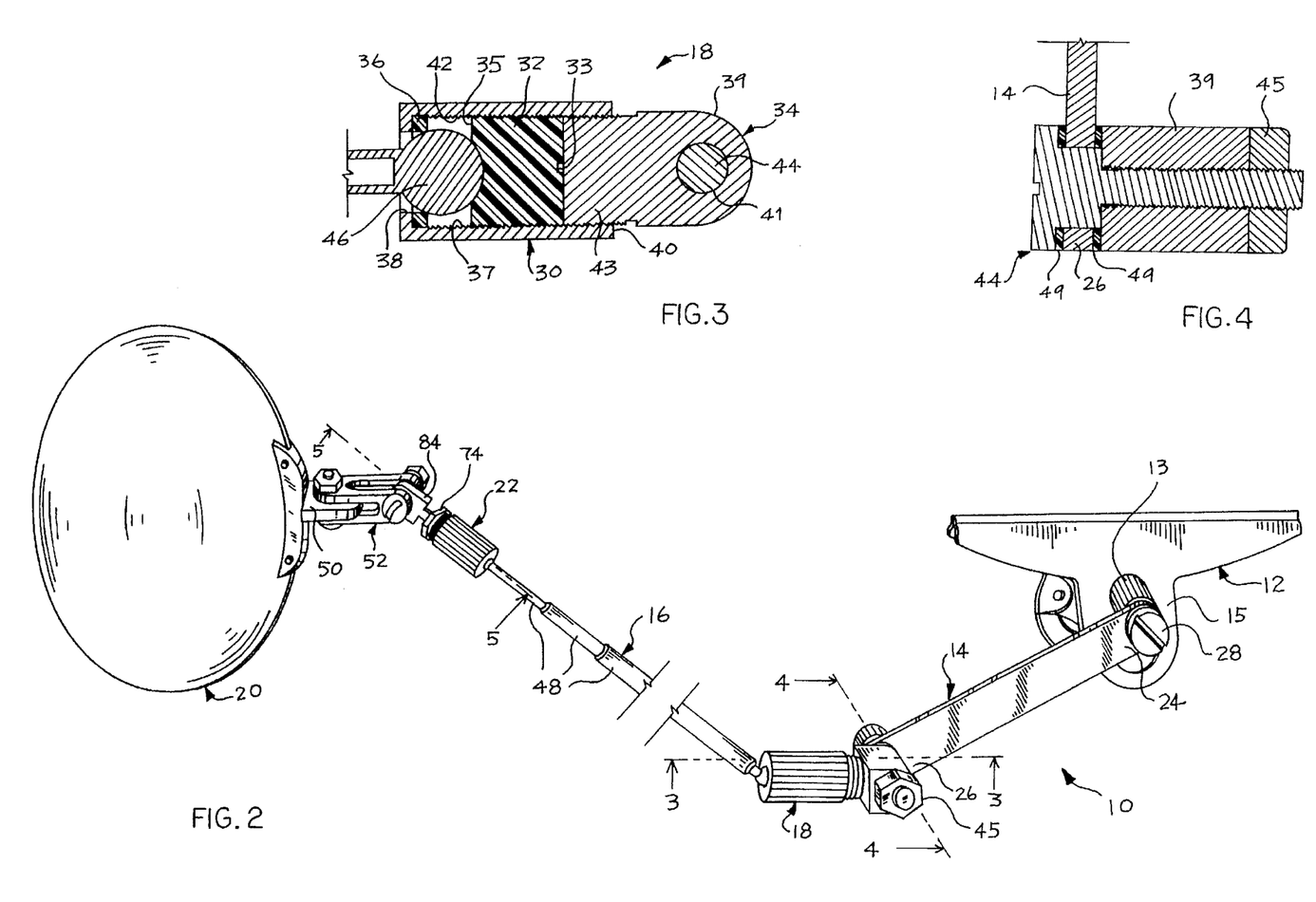
FIG. 2 is a perspective view of the preferred embodiment of the present invention sun shield swivel apparatus.
FIG. 3 is an enlarged cross-sectional view taken along line 3—3 of FIG. 2.
FIG. 4 is an enlarged cross-sectional view taken along line 4—4 of FIG. 2.

Referring to FIG. 2, there is shown a perspective view of the preferred embodiment of the present invention sun shield swivel apparatus 10. The sun shield swivel apparatus comprises a clamping member 12, an inner connecting swinging rod or arm 14, an outer telescoping connecting swinging rod or arm 16, a first universal joint assembly 18 connected between the inner swinging arm 14 and the outer telescopic swinging arm 16, a sun screen 20 and a second universal joint assembly 22 connected between the outer telescopic swinging arm 16 and the sun screen 20.

It will be appreciated that the shape and size of the clamping member 12 shown in this figure may be the clamping member shown in FIGS. 6, 9, 10, 11 and 12. Also, the clamping member may be coil, leaf or threaded means. A threaded socket 13 is attached to and located adjacent to upper part 15 of the clamping member 12. The inner connecting arm 14 has a distal end 24 and a proximal end 26. The distal end 24 of the inner connecting arm 14 is hingeably connected to the clamping member 12 by a threaded screw means 28 threadedly engaged with the threaded socket 13. The length of the inner connecting arm 14 is greater than a width of the sun visor 2 of the vehicle (see FIG. 1), thereby allowing the sun visor to be in a closed condition or original position (the sun visor abutting against the roof of the vehicle) once the clamping member 12 has been clamped to the sun visor of the vehicle.

Referring to FIG. 3, there is shown at 18 an enlarged cross-sectional view of the first universal joint assembly comprised of a hollow cylindrical shaped cylinder 30, a tension screw member 32 and a linking adaptor member 34. The hollow cylindrical shaped cylinder 30 has an inner flange end 38, a plastic washer 36 located adjacent to and abuts against the inner flange end 38, an opened end 40 and internal screw threads 42 running along the length of its body. The tension screw member 32 has a slotted end 33, a concave end 35 and external screw threads 37 running along the length of its body. The slotted end 33 may be a cross end or any other type of end, which may be adapted for a tool such as a screwdriver to drive the tension screw member 32 into the cylindrical shaped cylinder 30. The linking adaptor member 34 has a head portion 39 with a transverse opening 41 and a rear portion 43 with external screw threads.

Figures 5, 9:
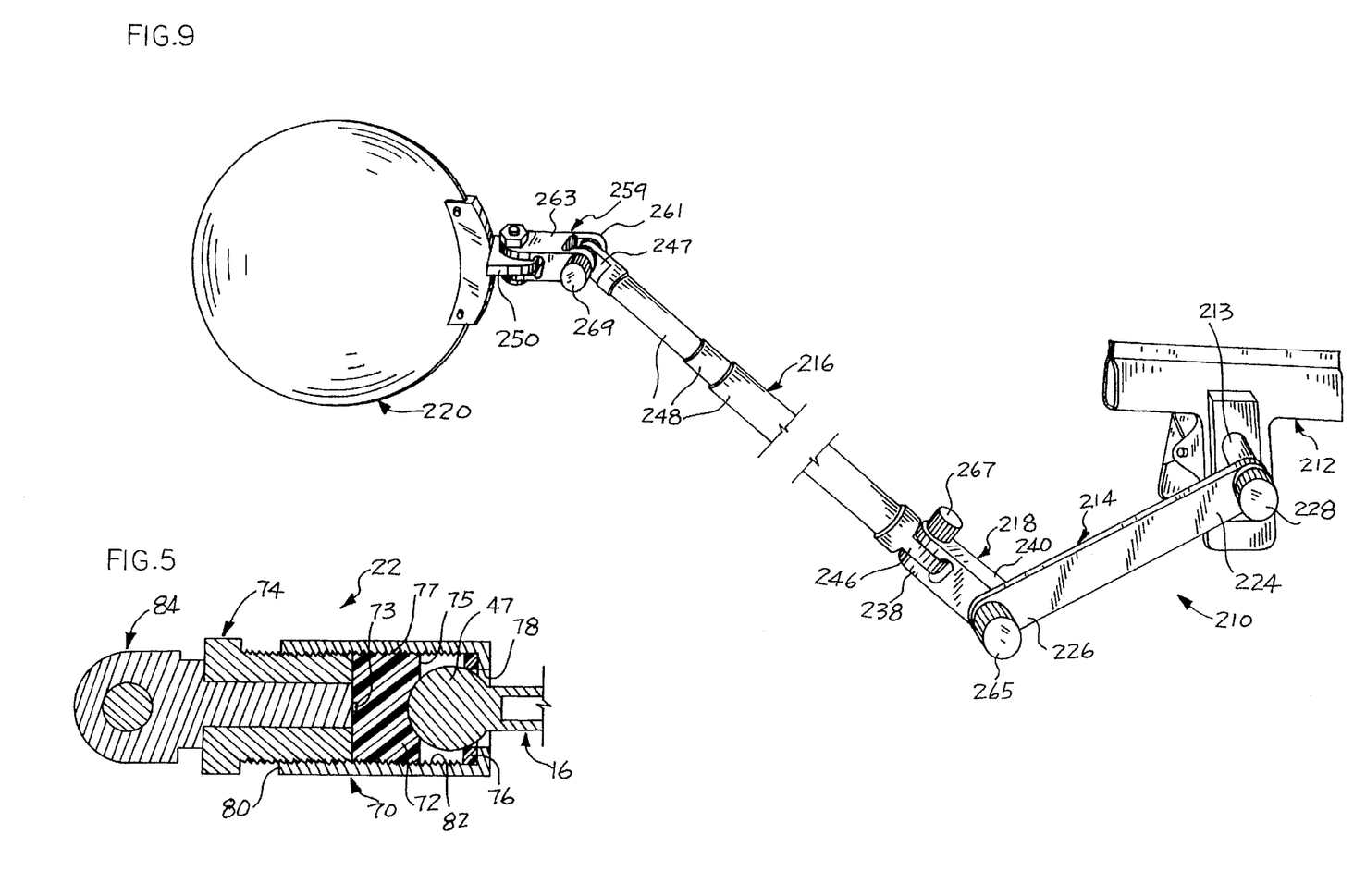
FIG. 5 is an enlarged cross-sectional view taken along line 5—5 of FIG. 2.
FIG. 9 is a perspective view of another alternative embodiment of the present invention sun shield swivel apparatus.

Referring to FIGS. 2, 3 and 5, the outer telescoping swinging arm 16 comprises a distal ball bearing joint end 46, a proximal ball bearing joint end 47 and a plurality of sections 48 slidable within each other for lengthening or shortening the telescoping swinging arm 16. The distal ball bearing joint end 46 is installed within the cylindrical shaped cylinder 30 and abuts against the washer 36, such that the proximal ball bearing joint end 47 extends out from the inner flange end 38 of the cylindrical shaped cylinder 30 of the first joint assembly 18.

Referring to FIG. 3, the external screw threads 37 of the tension screw member 32 is threadedly engaged with the internal screw threads 42 of the cylindrical shaped cylinder 30, such that the concave end 35 is abutted against the distal ball bearing joint end 46 of the telescoping swinging arm 16. The tension screw member 32 is then adjusted to the desired tension on the distal ball bearing joint end 46. The rear portion 43 of the linking adaptor member 34 is threadedly screwed from the opened end 40 into the hollow cylindrical shaped cylinder 30, where the external screw threads of the rear portion 43 engage with the internal screw threads 42 of the cylindrical shaped cylinder 30 as shown. The head portion 39 extends out from the opened end 40 of the cylindrical shaped cylinder 30, where the head portion 39 is hingeably connected to the proximal end 26 of the inner swinging arm 14 by an elongated threaded bolt 44.

Referring to FIG. 4, the threaded bolt 44 is inserted through an opening on the proximal end 26 of the inner swinging arm 14 and into the transverse opening 41 of the head portion 39 of the linking adaptor member 34, and thereby tightly secured by a nut 45 and plastic washers 49.

Referring to FIG. 5, there is shown at 22 an enlarged cross-sectional view of the second universal joint assembly which is very similar to the first universal joint assembly 18. The second joint assembly 22 comprises a hollow cylindrical shaped cylinder 70, a tension screw member 72, an adaptor member 74 and a linking shaft 84. The hollow cylindrical shaped cylinder 70 has an inner flange end 78, a plastic washer 76 located adjacent to and abuts against the inner flange end 78, an opened end 80 and internal screw threads 82 running along the length of its body. The tension screw member 72 has a slotted end 73, a concave end 75 and external screw threads 77 running along the length of its body. The slotted end 73 may be a cross end or any other type of end, which may be adapted for a tool such as a screwdriver to drive the tension screw member 72 into the cylindrical shaped cylinder 70. The adaptor member 74 has external screw threads and a central opening, where the linking shaft 84 is installed within the central opening therethrough. The proximal ball bearing joint end 47 of the telescoping swinging arm 16 is installed within the cylindrical shaped cylinder 70 and abuts against the washer 76. The external screw threads 77 of the tension screw member 72 is threadedly engaged with the internal screw threads 82 of the cylindrical shaped cylinder 70, such that the concave end 75 is abutted against the proximal ball bearing joint end 47 of the telescoping swinging arm 16. The tension screw member 72 is then adjusted to the desired tension on the proximal ball bearing joint end 47. The adaptor member 74 is threadedly screwed from the opened end 80 into the hollow cylindrical shaped cylinder 70, where the external screw threads engage with the internal screw threads 82 of the cylindrical shaped cylinder 70. The linking shaft 84 extends out from the opened end 80 of the cylindrical shaped cylinder 70.

Referring again to FIG. 2, the sun screen 20 is generally elliptical shaped. The sun screen 20 may be made out of a non-transparent material or a transparent smoked material, preferably non-transparent material. The sun screen 20 has a connecting tab 50 which is attached to an edge on the sun screen 20.

A shaft support 52 is provided for connecting the sun screen 20 and the linking shaft 84 together. The shaft support 52 has two opposite ends which are arranged in a U-shaped configuration, where the connecting tab 50 is hingeably connected within one of the two U-shaped opposite ends by screw and nut means. The linking shaft 84 of the second universal joint assembly 22 is hingeably connected within the other one of the two U-shaped opposite ends of the shaft support 52 by screw and nut means.

By having this type of arrangement, the sun screen 20 can be swivelled to any position imaginable inside the vehicle for shielding the eyes of the occupant, and thereby friction will maintain the sun shield swivel apparatus 10 in position.

The sun shield swivel apparatus 10 can be made from several materials. By way of example, the present invention sun shield swivel apparatus can be made of metal material or any other suitable material. The present invention conforms to conventional forms of manufacture or any other conventional way known to one skilled in the art.

The alternative embodiment of the present invention is very similar to the preferred embodiment discussed above and the only difference is that the second universal joint assembly 22 (see FIG. 2) is eliminated from this embodiment and replaced by a second shaft support 159. All of the parts of the alternative embodiment sun shield swivel apparatus 110 are numbered correspondingly with 100 added to each number.

Referring to FIG. 6, there is shown at 110 a perspective view of the alternative embodiment of the present invention sun shield swivel apparatus of comprised of a different clamping member 112 then the clamping member 12 shown in FIG. 2, an inner connecting swinging rod or arm 114, an outer telescoping connecting swinging rod or arm 116, an universal joint assembly 118 connected between the inner swinging arm 14 and the outer telescopic swinging arm 116 and a sun screen 120. All of the components are substantially identical up to this point, and the description thereof will be repeated and only the modified and the added components will be described below.

Figures 7, 8:
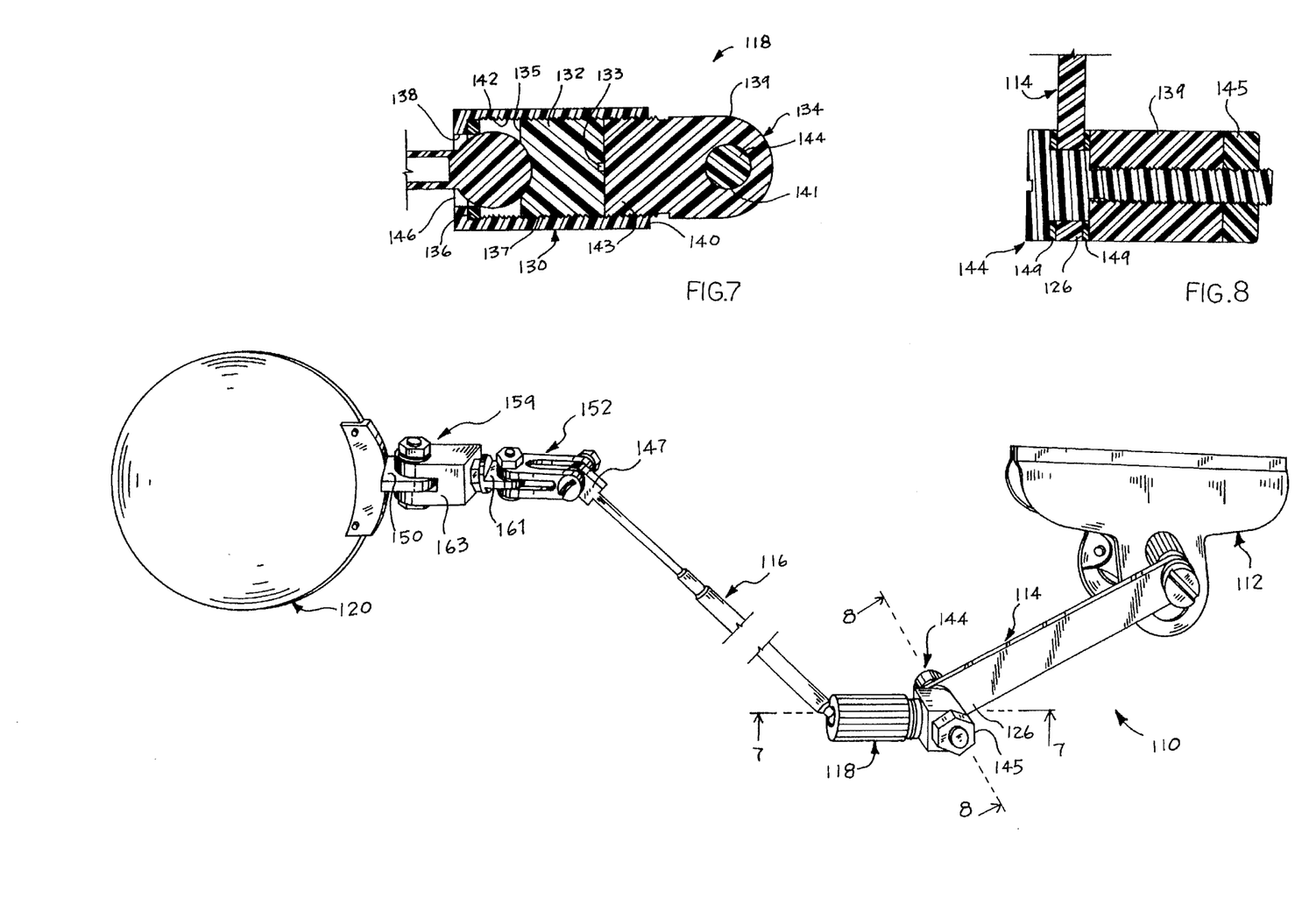
FIG. 7 is an enlarged cross-sectional view taken along line 7—7 of FIG. 6.
FIG. 8 is an enlarged cross-sectional view taken along line 8—8 of FIG. 6.

Referring to FIG. 7, there is shown at 118 the universal joint assembly comprised of a hollow cylindrical shaped cylinder 130, a tension screw member 132 and a linking adaptor member 134. The hollow cylindrical shaped cylinder 130 has an inner flange end 138, a washer 136 located adjacent to and abuts against the inner flange end 138, an opened end 140 and internal screw threads 142 running along the length of its body. The tension screw member 132 has a slotted end 133, a concave end 135 and external screw threads 137 running along the length of its body. The slotted end 133 may be a cross end or any other type of end, which may be adapted for a tool such as a screwdriver to drive the tension screw member 132 into the cylindrical shaped cylinder 130. The linking adaptor member 134 has a head portion 139 with a transverse opening 141 and a rear portion 143 with external screw threads.

Referring to FIGS. 6 and 7, the outer telescoping swinging arm 116 comprises a distal ball bearing joint end 146, a proximal linking end 147 and a plurality of sections 148 slidable within each other for lengthening or shortening the telescoping swinging arm 116. The distal ball bearing joint end 146 is installed within the cylindrical shaped cylinder 130 and abuts against the washer 136, such that the proximal linking end 147 extends out from the inner flange end 138 of the cylindrical shaped cylinder 130 of the joint assembly 118.

Referring to FIG. 7, the external screw threads 137 of the tension screw member 132 is threadedly engaged with the internal screw threads 142 of the cylindrical shaped cylinder 130, such that the concave end 135 is abutted against the distal ball bearing joint end 146 of the telescoping swinging arm 116. The tension screw member 132 is then adjusted to the desired tension on the distal ball bearing joint end 146. The rear portion 143 of the linking adaptor member 134 is threadedly screwed from the opened end 140 into the hollow cylindrical shaped cylinder 130, where the external screw threads of the rear portion 143 engage with the internal screw threads 142 of the cylindrical shaped cylinder 130. The head portion 139 extends out from the opened end 140 of the cylindrical shaped cylinder 130, where the head portion 139 is hingeably connected to the proximal end 126 of the inner swinging arm 114 by an elongated threaded bolt 144.

Referring to FIG. 8, the threaded bolt 144 is inserted through an opening on the proximal end 126 of the inner swinging arm 114 and into the transverse opening 141 of the head portion 139 of the linking adaptor member 134, and thereby tightly secured by a nut 145 and washers 149.

Referring again to FIG. 6, a shaft support 152 is provided and has two opposite ends which are arranged in a U-shaped configuration, where the proximal linking end 147 is hingeably connected within the U-shaped configuration at one end by screw and nut means. Another shaft support 159 is provided and has a lower connecting tab portion 161 and an upper U-shaped portion 163. The lower connecting tab portion 161 is hingeably connected to the other end of the U-shaped shaft support 152 by screw and nut means.

The sun screen 120 is generally circular shaped. The sun screen 120 may be made out of a non-transparent material or a transparent smoked material, preferably non-transparent material. The sun screen 120 has a connecting tab 150 which is attached to an edge on the sun screen 120. The connecting tab 150 is hingeably connected to the upper U-shaped portion 163 of the shaft support 159 by screw and nut means.

By having this type of arrangement, the sun screen 120 can be swivelled to any position imaginable inside the vehicle for shielding the eyes of the occupant, and thereby friction will maintain the sun shield swivel apparatus 110 in position.

The sun shield swivel apparatus 110 can be made from several materials. The manufacturing process which could accommodate the construction of the present invention may be injection, thermoform, etc. or other molding process. By way of example, the present invention sun shield swivel apparatus 110 is made of all plastic material. The present invention conforms to conventional forms of manufacture or any other conventional way known to one skilled in the art.

Referring to FIG. 9, there is shown at 210 a perspective view of another embodiment of the present invention sun shield swivel apparatus which is similar to the preferred embodiment described above and the only difference is that the universal joint assemblies 18 and 22 (see FIG. 2) are eliminated from this embodiment. All of the parts of the sun shield swivel apparatus 210 are numbered correspondingly with 200 added to each number.

The sun shield swivel apparatus 210 comprises a different clamping member 212 then the clamping members 12 and 112 shown in FIGS. 2 and 6, an inner connecting swinging rod or arm 214, an outer telescoping connecting swinging rod or arm 216 and a sun screen 220. All of the components are substantially identical up to this point, and the description thereof will be repeated and only the modified and the added components will be described below.

The inner swinging arm 214 has a distal end 224 and a proximal end 226. The distal end 224 of the inner connecting arm 214 is hingeably connected to the clamping member 212 by a turnable threaded screw means 228 threadedly engaged with a threaded socket 213 of the clamping member 212. A linking adaptor member 218 has a U-shaped end 238 and an opposite end 240, where the opposite end 240 is hingeably connected to the proximal end 226 of the inner swinging arm 214 by a turnable threaded screw means 265.

The outer telescoping swinging arm 216 comprises a distal linking end 246, a proximal linking end 247 and a plurality of sections 248 slidable within each other for lengthening or shortening the telescoping swinging arm 216.

The distal linking end 246 is hingeably connected to the U-shaped end 238 of the linking adaptor member 218 by a turnable screw threaded means 267.

A shaft support 259 is provided and has a lower U-shaped end 261 and an upper U-shaped end 263, where the proximal linking end 247 of the telescoping swinging arm 216 is hingeably connected to the lower U-shaped end 261 by another turnable screw threaded means 269.

The sun screen 220 is generally circular shaped and has a connecting tab 250 which is attached to an edge on the sun screen 220. The connecting tab 250 is hingeably connected to the upper U-shaped end 263 of the shaft support 259 by screw and nut means.

Figure 10:
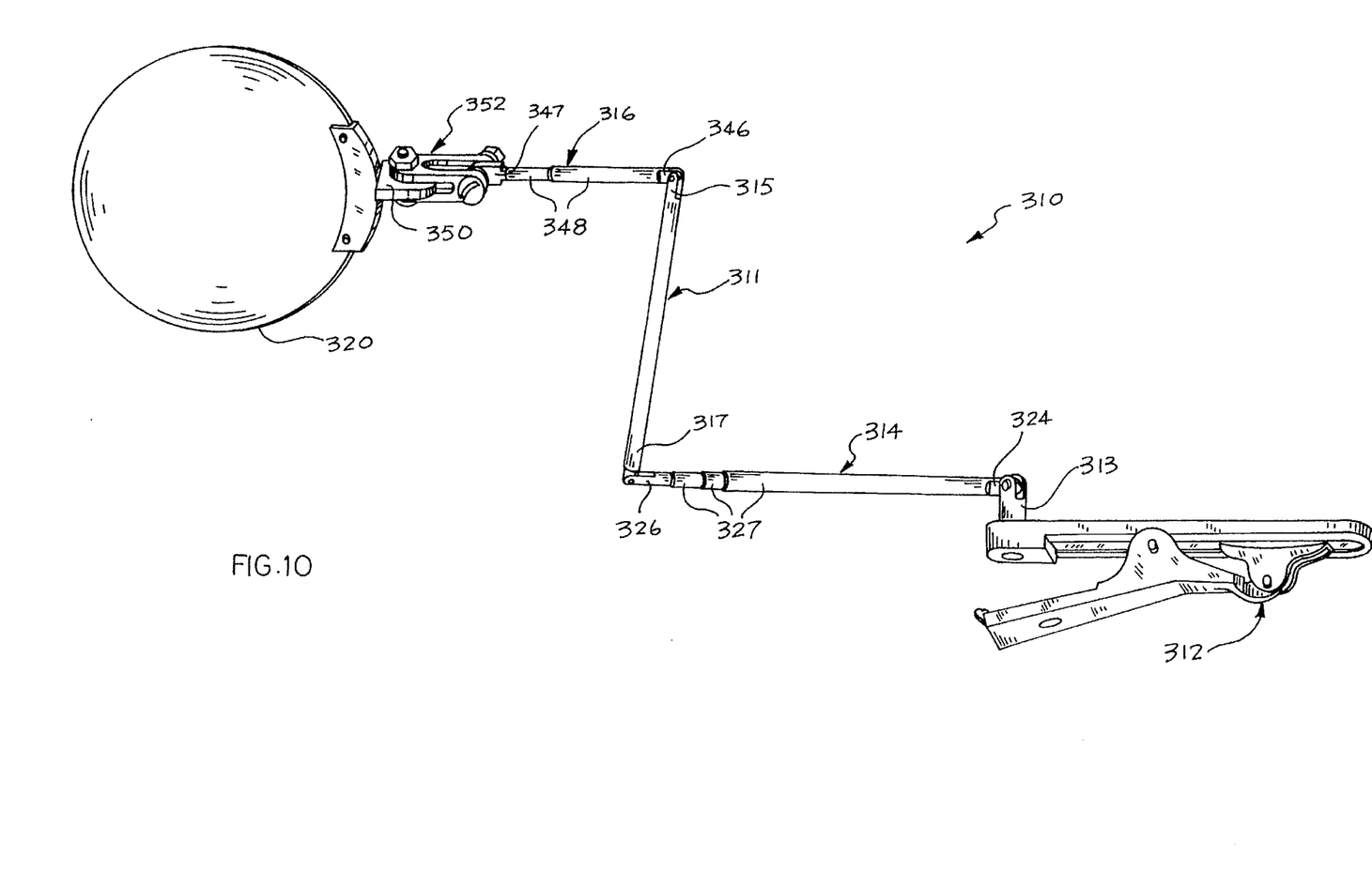
FIG. 10 is a perspective view of a further alternative embodiment of the present invention sun shield swivel apparatus.

Referring to FIG. 10, there is shown at 310 a perspective view of a further alternative embodiment of the present invention sun shield apparatus comprises. This embodiment of the present invention is very similar to the preferred embodiment discussed above and the only difference is that the first and second universal joint assemblies 18 and 22 (see FIG. 2) is eliminated from the embodiment. All of the parts of the alternative embodiment sun shield apparatus 310 are numbered correspondingly with 300 added to each number.

The sun shield apparatus 310 comprises a different clamping member 312, an inner telescoping connecting swinging rod or arm 314, an outer telescoping connecting swinging rod or arm 316, a middle connecting swinging rod or arm 311 connected between the telescoping swinging arms 314 and 316, and a sun screen 320. All of the components are substantially identical up to this point, and the description thereof will be repeated and only the modified and the added components will be described below.

Figure 11:
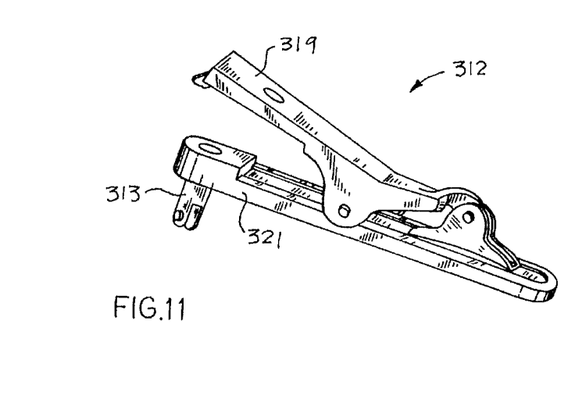
FIG. 11 is a perspective view of another clamping member of the present invention sun shield swivel apparatus.
Figure 12:
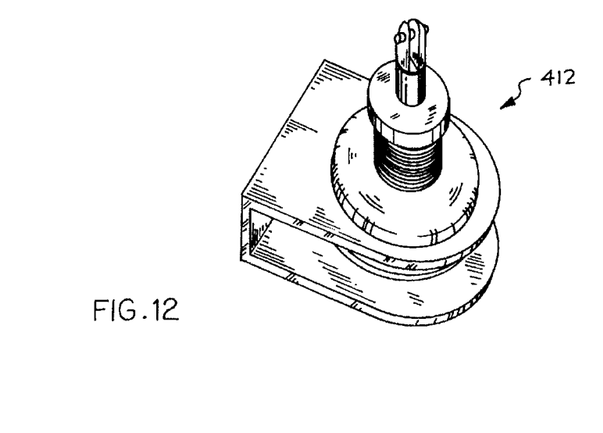
FIG. 12 is a perspective view of still another clamping member which is a mounting base of the present invention sun shield swivel apparatus.

Referring to FIG. 11, there is shown at 312 a perspective view of another clamping member which comprises a top arm 319 and a bottom arm 321. A protruding connecting tip 313 is attached to the bottom arm 321. It will be appreciated that the clamping member 312 can be interchangeable with a mounting base member 412 as shown in FIG. 12. It is within the spirit and scope of the present invention to have a plurality of different clamping members not illustrated with the present invention sun shield apparatus.

The inner telescoping swinging arm 314 has a distal linking end 324, a proximal linking end 326 and a plurality of sections 327 slidable within each other for lengthening or shortening the inner swinging arm 314. The distal linking end 324 of the inner telescoping swinging arm 314 is hingeably connected to the protruding connecting tip 313 of the clamping member 312 by screw and nut means.

The middle swinging arm 311 has two opposite proximal linking ends 315 and 317. One of the two opposite proximal linking ends 317 is hingeably connected to the proximal linking end 326 of the inner telescoping swinging arm 314. The outer telescoping swinging arm 316 comprises a distal linking end 346, a proximal linking end 347 and a plurality of sections 348 slidable within each other for lengthening or shortening the telescoping swinging arm 316. The distal linking end 346 is hingeably connected to the other one of the two opposite proximal linking ends 315 of the middle swinging arm 311.

A shaft support 352 is provided and has two opposite ends which are arranged in a U-shaped configuration, where the proximal linking end 347 of the outer telescoping swinging arm 316 is hingeably connected within one of the two opposite U-shaped ends by screw and nut means.

The sun screen 320 is generally circular shaped. The sun screen 320 may be made out of a non-transparent material or a transparent smoked material. The sun screen 320 has a connecting tab 350 which is attached to an edge on the sun screen 320. The connecting tab 350 is hingeably connected to the other one of the two opposite U-shaped ends by screw and nut means.

Defined in detail, the present invention is a sun shield swivel apparatus adapted to block sunlight or the like from direct line of sight of the eyes of an occupant inside a vehicle, the apparatus comprising: (a) a clamping member clampable inside the vehicle; (b) an inner connecting arm having a distal end and a proximal end, the distal end hingeably connected to the clamping member; (c) an outer telescoping connecting arm having a plurality of section slidable within each other, a distal ball bearing joint end and a proximal ball bearing joint end; (d) a first joint assembly including a hollow cylinder, a tension screw and a linking adaptor, the hollow cylinder having an inner flange end and an opened end, where the distal ball bearing joint end of the outer telescoping connecting arm is installed within the hollow cylinder such that the proximal ball bearing joint end extends out from the inner flange end and the distal ball bearing joint end abuts against the inner flange end, the tension screw and the linking adaptor threadedly screwed from the opened end of the hollow cylinder to maintain a first desired position for the outer telescoping connecting arm by friction and the linking adaptor extending out from the opened end and hingeably connected to the proximal end of the inner connecting arm; (e) a second joint assembly including a hollow cylinder, a tension screw and a linking adaptor, the hollow cylinder having an inner flange end and an opened end, where the proximal ball bearing joint end of the outer telescoping connecting arm is installed with the hollow cylinder and abuts against the inner flange end, the tension screw and the linking adaptor threadedly screwed from the opened end of the hollow cylinder to maintain a second desired position by friction; (f) a shaft support having two opposite U-shaped ends, one of the two opposite U-shaped ends hingeably connected to the linking adaptor of the second joint assembly; and (g) a sun screen for blocking the sunlight and having a connecting tab hingeably connected to the other one of the two opposite U-shaped ends of the shaft support, where the sun screen is maintained in the second desired position; (h) whereby the sun screen can swivel to any position imaginable inside the vehicle for blocking sunlight from direct line of sight of the eyes of the occupant inside the vehicle, such that the outer telescoping swinging arm and the sun screen are maintained in the first and second desired positions by friction.

Defined alternatively in detail, the present invention is a sun shield swivel apparatus adapted to block sunlight or the like from direct line of sight of the eyes of an occupant inside a vehicle, the apparatus comprising: (a) means for attaching the sun shield swivel apparatus inside the vehicle; (b) an inner connecting arm having a distal end and a proximal end, the distal end hingeably connected to the means for attaching the sun shield swivel apparatus; (c) an outer telescoping connecting arm having at least two sections slidable within each other, a distal ball bearing joint end and a proximal linking end; (d) a joint assembly including a hollow cylinder, a tension screw and a linking adaptor, the hollow cylinder having an inner flange end and an opened end, where the distal ball bearing joint end of the outer telescoping connecting arm is installed within the hollow cylinder such that the proximal ball bearing joint end extends out from the inner flange end and the distal ball bearing joint end abuts against the inner flange end, the tension screw and the linking adaptor threadedly screwed from the opened end of the hollow cylinder to maintain a desired position for the outer telescoping connecting arm by friction and the linking adaptor extending out from the opened end and hingeably connected to the proximal end of the inner connecting arm; (e) a shaft support having two opposite U-shaped ends, one of the two opposite U-shaped ends hingeably connected to the proximal linking end of the outer telescoping connecting arm; and (f) a screen for blocking the sunlight and having a connecting tab hingeably connected to the other one of the two opposite U-shaped ends of the shaft support; (g) whereby the screen can swivel to any position imaginable inside the vehicle for blocking sunlight from direct line of sight of the eyes of the occupant inside the vehicle, such that the outer telescoping connecting arm is maintained in the desired position by friction, and thereby maintains the screen in position.

Defined also alternatively in detail, the present invention is a shield swivel apparatus adapted to block sunlight or the like from direct line of sight of the eyes of an occupant inside a vehicle, the apparatus comprising: (a) means for attaching the shield swivel apparatus inside the vehicle; (b) a first swinging arm a distal end and a proximal end, the distal end hingeably connected to the means for attaching the sun shield swivel apparatus; (c) a second swinging arm having at least two sections slidable within each other, a distal end and a proximal end, the distal end hingeably connected to the proximal end of the first swinging arm; (d) a shaft support having two opposite ends, one of the two opposite ends hingeably connected to the proximal end of the second swinging arm; and (e) a screen hingeably connected to the other one of the two opposite ends the shaft support; (f) whereby the screen can swivel to any position imaginable inside the vehicle for blocking sunlight or the like from direct line of sight of the eyes of the occupant inside the vehicle.

Defined further alternatively in detail, the present invention is a shield swivel apparatus adapted to block sunlight or the like from direct line of sight of the eyes of an occupant inside a vehicle, the apparatus comprising: (a) means for attaching the shield swivel apparatus inside the vehicle; (b) a first telescoping swinging arm having at least two sections slidable within each other, a distal end and a proximal end, the distal end hingeably connected to the means for attaching the shield swivel apparatus; (c) a middle swinging arm having two opposite proximal ends, one of the two opposite proximal ends hingeably connected to the proximal end of the first telescoping swinging arm; (d) a second telescoping swinging arm having at least two sections slidable within each other, a distal end and a proximal end, the distal end hingeably connected to the other one of the two opposite proximal ends of the middle swinging arm; and (e) a screen hingeably connected to the proximal end of the second telescoping swinging arm; (f) whereby the screen can swivel to any position imaginable inside the vehicle for blocking sunlight or the like from direct line of sight of the eyes of the occupant inside the vehicle.

Defined broadly, the present invention is a shield swivel apparatus adapted to block sunlight or the like from direct line of sight of the eyes of an occupant inside a vehicle, the apparatus comprising: (a) means for attaching the shield swivel apparatus inside the vehicle; (b) at least two swinging arms each having a distal end and a proximal end, the distal end of one of the at least two swinging arms hingeably connected to the means for attaching the shield swivel apparatus, the distal end of the other one of the at least two swinging arms hingeably connected to the proximal end of the one of the at least two swinging arms; and (c) a screen hingeably connected to the proximal end of the other one of the at least two swinging arms; (d) whereby the screen can swivel to any position imaginable inside the vehicle for blocking sunlight or the like from direct line of sight of the eyes of the occupant inside the vehicle.

Defined more broadly, the present invention is a shield swivel apparatus adapted to block sunlight or the like from direct line of sight of the eyes of an occupant inside a vehicle, the apparatus comprising: (a) means for attaching the shield swivel apparatus inside the vehicle; (b) at least one swinging arm having a distal end and a proximal end, the distal end hingeably connected to the means for attaching the shield swivel apparatus; (c) a screen; (d) a joint assembly hingeably connected between the proximal end of the at least one swinging arm and the screen, the joint assembly having means for maintaining the at least one swinging arm and the screen in a desired position by friction; (e) whereby the screen can swivel to any position imaginable inside the vehicle for blocking sunlight or the like from direct line of sight of the eyes of the occupant inside the vehicle such that the at least one swinging arm and the screen are maintained in the desired position by friction.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A sun shield swivel apparatus adapted to block sunlight or the like from direct line of sight of the eyes of an occupant inside a vehicle, the apparatus comprising:

a. a clamping member clampable inside the vehicle;

b. an inner connecting arm having a distal end and a proximal end, the distal end hingeably connected to said clamping member;

c. an outer telescoping connecting arm having a plurality of sections slidable within each other, a distal ball bearing joint end and a proximal ball bearing joint end;

d. a first joint assembly including a hollow cylinder, a tension screw and a linking adaptor, the hollow cylinder having an inner flange end and an opened end, said distal ball bearing joint end of said outer telescoping connecting arm slidably installed within the hollow cylinder such that said proximal ball bearing joint end extends out from the inner flange end, where said distal ball bearing joint end abuts against the inner flange end and the tension screw threadedly screwed from the opened end of the hollow cylinder to secure said distal ball bearing joint end therein, and thereby maintains a first desired position for said outer telescoping connecting arm by friction;

e. said linking adaptor of said first joint assembly threadedly engaged within said hollow cylinder and extending out from said opened end and hingeably connected to said proximal end of said inner connecting arm;

f. a second joint assembly including a hollow cylinder, a tension screw and a linking adaptor, the hollow cylinder having an inner flange end and an opened end, said proximal ball bearing joint end of said outer telescoping connecting arm installed within the hollow cylinder and abuts against said inner flange end and the tension screw threadedly screwed from the opened end of the hollow cylinder to secure said proximal ball bearing joint end therein, and thereby maintains a second desired position by friction;

g. said linking adaptor of said second joint assembly threadedly engaged within said hollow cylinder of said second joint assembly and extending out from said opened end;

h. a shaft support having two opposite U-shaped ends, one U-shaped end hingeably connected to said linking adaptor of said second joint assembly; and i. a sun screen for blocking the sunlight and having a connecting tab hingeably connected to the other U-shaped end of said shaft support, where the sun screen is maintained in the second desired position;

j. whereby said sun screen can swivel to multiple positions inside the vehicle for blocking sunlight from direct line of sight of the eyes of the occupant inside the vehicle, such that said outer telescoping swinging arm and said sun screen are maintained in the first and second desired positions by friction.

2. The sun shield swivel apparatus in accordance with claim 1 wherein said sun screen is generally elliptical shaped.

3. The sun shield swivel apparatus in accordance with claim 1 wherein said sun screen is generally circular shaped.

4. The sun shield swivel apparatus in accordance with claim 1 wherein said sun screen is made of transparent smoked material.

5. The sun shield swivel apparatus in accordance with claim 1 wherein said inner connecting arm has a length greater than a width of a visor of the vehicle.

6. A sun shield swivel apparatus adapted to block sunlight or the like from direct line of sight of the eyes of an occupant inside a vehicle, the apparatus comprising:

a. means for attaching said sun shield swivel apparatus inside the vehicle;

b. an inner connecting arm having a distal end and a proximal end, the distal end hingeably connected to said means for attaching said sun shield swivel apparatus;

c. an outer telescoping connecting arm having at least two sections slidable within each other, a distal ball bearing joint end and a proximal linking end;

d. a joint assembly including a hollow cylinder, a tension screw and a linking adaptor, the hollow cylinder having an inner flange end and an opened end, said distal ball bearing joint end of said outer telescoping connecting arm installed within the hollow cylinder such that said proximal linking end extends out from the inner flange end, where said distal ball bearing joint end abuts against the inner flange end and the tension screw threadedly screwed from the opened end of the hollow cylinder to secure said distal ball bearing joint end therein, and thereby maintains a desired fixed position for said outer telescoping connecting arm by friction between the inner flange of the hollow cylinder and the tension screw;

e. said linking adaptor threaded engaged within said hollow cylinder and extending out from said opened end and hingeably connected to said proximal end of said inner connecting arm;

f. a shaft support having two opposite U-shaped ends, one U-shaped end hingeably connected to said proximal linking end of said outer telescoping connecting arm; and g. a screen for blocking the sunlight and having a connecting tab hingeably connected to the other U-shaped end of said shaft support;

h. whereby said screen can swivel to multiple positions inside the vehicle for blocking sunlight from direct line of sight of the eyes of the occupant inside the vehicle, such that said outer telescoping connecting arm is maintained in the desired position by friction, and thereby maintains said screen in position.

7. The apparatus in accordance with claim 6 wherein said screen is generally elliptical shaped.

8. The apparatus in accordance with claim 6 wherein said screen is generally circular shaped.

9. The apparatus in accordance with claim 6 wherein said screen is made of transparent smoked material.

10. The apparatus in accordance with claim 6 wherein said inner connecting arm has a length greater than a width of a visor of the vehicle.

11. The apparatus in accordance with claim 6 wherein said means for attaching said sun shield swivel apparatus inside the vehicle comprises a clamping member.

12. The apparatus in accordance with claim 6 wherein said means for attaching said sun shield swivel apparatus inside the vehicle comprises a mounting base member.

* * * * *